US009874580B2

(12) United States Patent
O'Byrne et al.

(10) Patent No.: US 9,874,580 B2
(45) Date of Patent: Jan. 23, 2018

(54) METHOD AND SYSTEM FOR DETERMINING A VELOCITY OF A RELATIVE MOVEMENT BETWEEN AN OBJECT AND A FLUIDAL MEDIUM

(71) Applicant: NewSouth Innovations Pty Limited, Sydney (AU)

(72) Inventors: Sean Brendan O'Byrne, Queanbeyan (AU); Sven Marc Wittig, Munich (DE)

(73) Assignee: NewSouth Innovations Pty Limited, Sydney NSW (AU)

( * ) Notice: Subject to any disclaimer, the term of this patent is extended or adjusted under 35 U.S.C. 154(b) by 450 days.

(21) Appl. No.: 14/404,999

(22) PCT Filed: May 30, 2013

(86) PCT No.: PCT/AU2013/000567
§ 371 (c)(1),
(2) Date: Dec. 2, 2014

(87) PCT Pub. No.: WO2013/181687
PCT Pub. Date: Dec. 12, 2013

(65) Prior Publication Data
US 2015/0116696 A1    Apr. 30, 2015

(30) Foreign Application Priority Data

Jun. 5, 2012   (AU) .................................. 2012902351

(51) Int. Cl.
*G01P 3/36*  (2006.01)
*G01P 5/26*  (2006.01)
(Continued)

(52) U.S. Cl.
CPC ............... *G01P 5/26* (2013.01); *G01F 1/661* (2013.01); *G01F 1/662* (2013.01); *G01F 1/663* (2013.01); *G01F 1/712* (2013.01); *G01P 3/36* (2013.01)

(58) Field of Classification Search
CPC ..... G01P 5/26; G01P 3/36; G01F 1/661; G01F 1/662; G01F 1/663; G01F 1/712
See application file for complete search history.

(56) References Cited

U.S. PATENT DOCUMENTS 4,664,513 A *   5/1987   Webb .................. G01P 5/26
                                                356/28
2009/0163816 A1*   6/2009   Azuma ................ A61B 8/06
                                                600/454

OTHER PUBLICATIONS

Lyle; "Development of a Real-Time Diode-Laser Mass Flux Sensor for Simultaneous Measurement of Density and Velocity of Oxygen"; Report TSD-163, High Temperature Gasdynamics Laboratory, Mechanical Engineering Department, Stanford University, Stanford, California, Dec. 2005.

\* cited by examiner

*Primary Examiner* — Samantha K Abraham
(74) *Attorney, Agent, or Firm* — The Webb Law Firm (57) ABSTRACT

Disclosed is a method and a system for determining a velocity of a relative movement between a system for determining the velocity and a fluidal medium. The method includes directing at least two light beams through at least a portion of the fluidal medium using the system such that a portion of light of each light beam is absorbed by the fluidal medium. Further, the method includes detecting first and second spectral intensity profiles of at least two light beams to detect the light absorption. The method also includes determining a difference profile associated with spectral intensity differences between a first and a second spectral intensity profile; and integrating an absolute value function (Continued)

of the difference profile to determine the velocity. The at least two light beams are directed such that the first and second spectral intensity profiles each have a different spectral position. The system has components that are arranged to allow operation of the above-described method.

11 Claims, 6 Drawing Sheets

(51) Int. Cl.
*G01F 1/66* (2006.01)
*G01F 1/712* (2006.01)

METHOD AND SYSTEM FOR DETERMINING A VELOCITY OF A RELATIVE MOVEMENT BETWEEN AN OBJECT AND A FLUIDAL MEDIUM

CROSS-REFERENCE TO RELATED APPLICATIONS

This application is the United States national phase of International Application No. PCT/AU2013/000567 filed May 30, 2013 and claims priority to Australian Patent Application No. 2012902351 filed Jun. 5, 2012, the disclosures of which are hereby incorporated in their entirety by reference.

FIELD OF THE INVENTION

The present invention broadly relates to a method and a system for determining a velocity of a relative movement between a system and a fluidal medium, and relates particularly, though not exclusively, to a method and a system for determining the velocity of an airflow relative to an airborne object, such as an aircraft.

BACKGROUND OF THE INVENTION

It is important to have relatively precise information about the velocity of air relative to the airborne aircraft. Pitot tubes are widely used for this purpose and determine the relative velocity of the air by measuring air pressures.

Pitot tubes are oriented towards the airflow to measure a dynamic pressure. In order to ensure satisfactory operation, Pitot tubes have to be regularly maintained and protected from external impacts from materials such as ice, volcano ash, birds or insects.

Also, extensive calibrations and corrections are necessary in order to enable the required measurement precision. Failures of Pitot tubes have had fatal aircraft accidents as a consequence.

Recently optical methods have been developed for measuring the relative velocity of airflow.

SUMMARY OF THE INVENTION

The present invention provides in a first aspect a method of determining a velocity of a relative movement between a system for determining the velocity and a fluidal medium, the method comprising the steps of:
  directing at least two light beams through at least a portion of the fluidal medium using the system such that a portion of light of each light beam is absorbed by the fluidal medium;
  detecting first and second spectral intensity profiles of the at least two light beams to detect the light absorption;
  determining a difference profile associated with spectral intensity differences between a first and a second spectral intensity profile; and
  performing an operation that results at least in an approximation of an integral of an absolute value function of the difference profile to determine the velocity;
  wherein the at least two light beams are directed such that the first and second spectral intensity profiles each have a different spectral position.

For the ease of understanding, the term "light" is used throughout this specification as a synonym for any suitable type of electromagnetic radiation, including for example visible light invisible light.

In one specific embodiment the step of performing an operation that results at least in an approximation of an integral of an absolute value function of the difference profile is performed such that a value (typically a single value), such as a voltage value, is generated that is a function of the velocity. The function of the velocity typically is a monotonic function for a given pressure and temperature of the fluidal medium. This embodiment provides the significant advantage that curve fitting may not be required, which simplifies the determination of the velocity and facilitates reduction of measurement or processing time.

The step of performing an operation that results at least in an approximation of an integral typically comprises integrating an absolute value function of the difference profile to determine the velocity.

Embodiments of the present invention have significant advantages. For example, in one embodiment the method, which exploits the so-called "Doppler shift", may be conducted such that velocities can be determined in a relatively reliable fast manner that is substantially independent of direct external influences, such as icing.

The at least two light beams typically are directed such that the spectral position of each spectral intensity profile is indicative of the velocity.

In one embodiment the fluidal medium is a gaseous medium, such as air. Alternatively, the fluidal medium may be a liquid or a vapour of a liquid, such as water vapour.

The step of integrating the difference profile may comprise integrating the difference profile over a spectral parameter to determine the velocity. For example, the spectral parameter may be a wavelength or a frequency.

The system may be arranged on or in a moving object, such as an aircraft.

The at least two light beams may have different spectral intensity profiles prior to propagation through at least a portion of the fluidal medium, but in one specific embodiment the at least two light beams have largely identical spectral intensity profiles prior to propagation through the fluidal medium.

The velocity of the relative movement between a system and a fluidal medium may be determined with any suitable frequency, such a frequency in the range of 0.1 Hz-100 Hz, 100 Hz-1 kHz, 1 kHz-10 kHz, 10 kHz-100 kHz and 100 kHz-1 MHz.

The at least two light beams may be directed through the fluidal medium at an orientation relative to each other that defines any suitable angle. Further, two light beams may be directed such that the spectral profile associated with one of the light beams experiences, as a function of the velocity, a spectral shift in opposite spectral direction to the spectral profile associated with the other one of the light beams. In this case the light beams typically are directed such that the paths of light of the at least two light beams have direction vector components that are opposite to each other. In one specific example two light beams are directed in directions that are substantially anti-parallel to each other.

The at least two light beams may be directed through any suitable fluidal medium. For example, the at least two light beams may be directed through air and a portion of the light of the at least two light beams is in this example typically is absorbed by oxygen molecules of the air, but may also be absorbed by other molecules, such as molecules of water vapour and nitrogen. In an alternative example the at least two beams of light are directed through a medium other than air, such as through the interior of a gas pipeline or the like.

In this case a portion of the light of the at least two light beams may be absorbed by hydrocarbon molecules, such as $CH_4$.

Each light beam may be directed through at least a portion of the fluidal medium at an oblique angle relative to the direction of the movement.

The at least two light beams may originate from one light source. Alternatively, the at least two light beams may originate from respective light sources. In one example the at least two light beams originate from at least one laser, such as a laser and in one specific form the at least two light beams may originate from at least one vertical cavity surface emitting laser (VCSEL). The step of directing the at least two light beams trough the fluidal medium may comprise directing laser light though a beam splitter to generate the at least two beams of light and then guiding the at least two beams of light to the fluidal medium using optical fibres.

The method may comprise the further step of processing the difference profile using a rectifier such as a full-wave rectifier. In this case, the difference profile typically is converted into a positive or negative polarity.

The step of integrating the difference profile to determine the velocity typically comprises determining a value that is indicative of the velocity.

The step of determining the difference profile may also comprise use of a differential amplifier and the step of integrating the difference profile may comprise use of a suitable analogue circuit. It may also be performed digitally after the two profiles have been acquired.

Further, the method may comprise the step of determining a pressure, and/or a temperature of the fluidal medium. Especially for high velocities information concerning the temperature and pressure can be used to enhance the accuracy with which the velocity is determined.

The present invention provides in a second aspect a system for determining a velocity of a relative movement between the system and a fluidal medium, the system comprising:
- a light source for generating at least two light beams and directing the at least two light beams through at least a portion of the fluidal medium during a relative movement between the system and a fluidal medium such that a portion of light of each light beam is absorbed by the fluidal medium;
- a detector arrangement for detecting spectral intensity profiles of the at least two light beams to detect the light absorption; and
- a processor for determining the velocity using the spectral intensity profiles;
- wherein the system is arranged to direct the at least two light beams through at least a portion of the fluidal medium such that each spectral intensity profile has a different spectral position.

The system typically is arranged to generate a value (typically a single value), such as a voltage value, that is a function of the velocity. The function of the velocity typically is a monotonic function for a given pressure and temperature of the fluidal medium.

The system may be arranged on or in an object such as an aircraft.

In one embodiment the fluidal medium is a gaseous medium, such as air or another gaseous medium. Alternatively, the fluidal medium may be a liquid or a vapour of a liquid, such as water vapour.

The system may be arranged such that the spectral position of each light beam is indicative of the velocity. The system typically is arranged to direct two light beams in directions that are substantially anti parallel relative to each other.

The system may be arranged such that the at least two light beams originate from one light source.

Alternatively, the system may comprise respective light sources for the at least two light beams. The light source may comprise at least one laser, such as a laser diode or a vertical cavity surface emitting laser (VCSEL). In one example the detector arrangement comprises at least two photodiodes.

In one embodiment the system comprises optical fibres and is arranged such that the at least two light beams are guide at least partially by optical fibres to and from the fluidal medium.

The light source may also comprise an optical beam splitter that is arranged to receive light typically from the at least one laser. In this example the beam splitter is arranged to split the received light into the at least two beams of light. In addition, the light source may comprise lenses such as collimators through which respective ones of the at least two light beams exit to be directed through the fluidal medium. The system may comprise optical fibres for guiding the light between optical components such as between the at least one laser and the beam splitter, and between the beam splitter and the lenses or further optical components.

The detector arrangement typically comprises light detectors that are arranged to detect respective ones of the at least two light beams after the at least two light beams passed through at least a portion of the fluidal medium. The detector arrangement typically is coupled to the processor.

The processor typically comprises a differential amplifier and/or a rectifier and/or a suitable analogue circuit and/or a data memory.

The invention will be more fully understood from the following description of specific embodiments of the invention. The description is provided with reference to the accompanying drawings.

DETAILED DESCRIPTION OF SPECIFIC EMBODIMENTS

Embodiments of the present invention relate to a method and a system for determining a velocity of a relative movement between the system and a fluidal medium. The system may for example be associated with an airborne aircraft and the fluidal medium may be air through which the aircraft passes. Alternatively, the velocity of wind may for example be determined and the system for determining the velocity may be stationary. Further, the fluidal medium may for example be water vapour or a gas in a gas pipeline and may also be a liquid. A person skilled in the art will appreciate that the present invention has many different applications.

Figure 1:
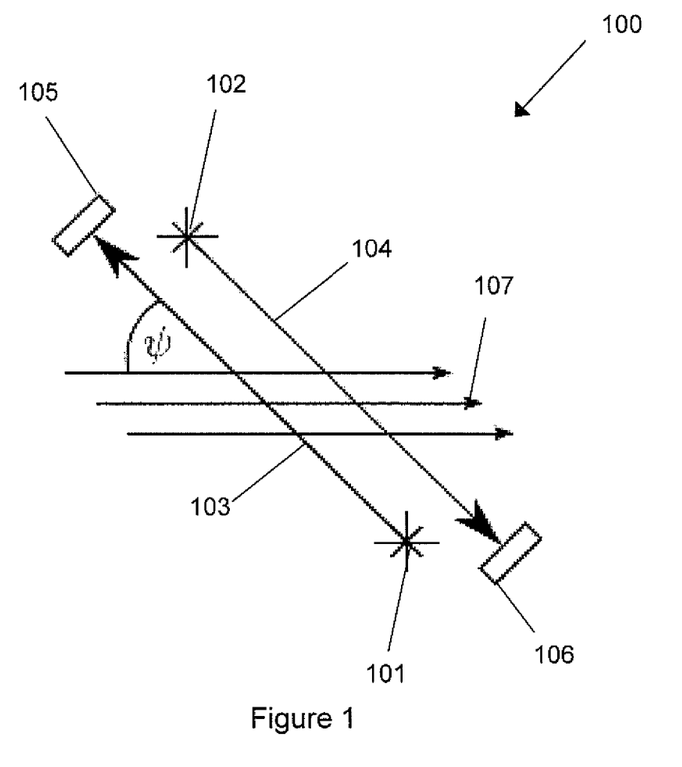
FIG. 1 shows a schematic representation of a system for determining a velocity in accordance with an embodiment of the present invention.

Referring initially to FIG. 1, there is shown a schematic representation of a system 100 in accordance with an embodiment of the present invention. The system 100 comprises two laser sources 101 and 102 that generate laser beams 103 and 104 that are directed in anti-parallel directions relative to each other.

The two laser beams 103 and 104 propagate through a fluidal medium 107 during the relative movement. The fluidal medium 107 is in this example air. The laser beams 103 and 104 form each an angle Ψ with the direction of the relative movement. As the fluidal medium 107 is air, a portion of light of the two laser beams 103 and 104 is absorbed by oxygen molecules in the air. It will be appreciated by a person skilled in the art that the angle Ψ may be different. Further, the laser beams 107 and 108 may not necessarily be anti-parallel to each other. Further, it will be appreciated by a person skilled in the art the alternatively absorption associated with elements or molecules other than oxygen may be detected.

It will also be appreciated by a person skilled in the art that the two laser beams 103 and 104 may alternatively also be generated by one laser source using any suitable arrangement for splitting light intensity and directing components of light intensity separately though the fluidal medium, which will be described further below with reference to FIG. 3. Further, it will be appreciated that the system 100 may be arranged to generate any number of laser beams greater than two.

In the particular embodiment shown in FIG. 1, the system 100 is stationary and the fluidal medium 107 moves relative to the system 100. Alternatively, the system may be arranged on a moving object (as described further below with reference to FIG. 6).

Figure 2:
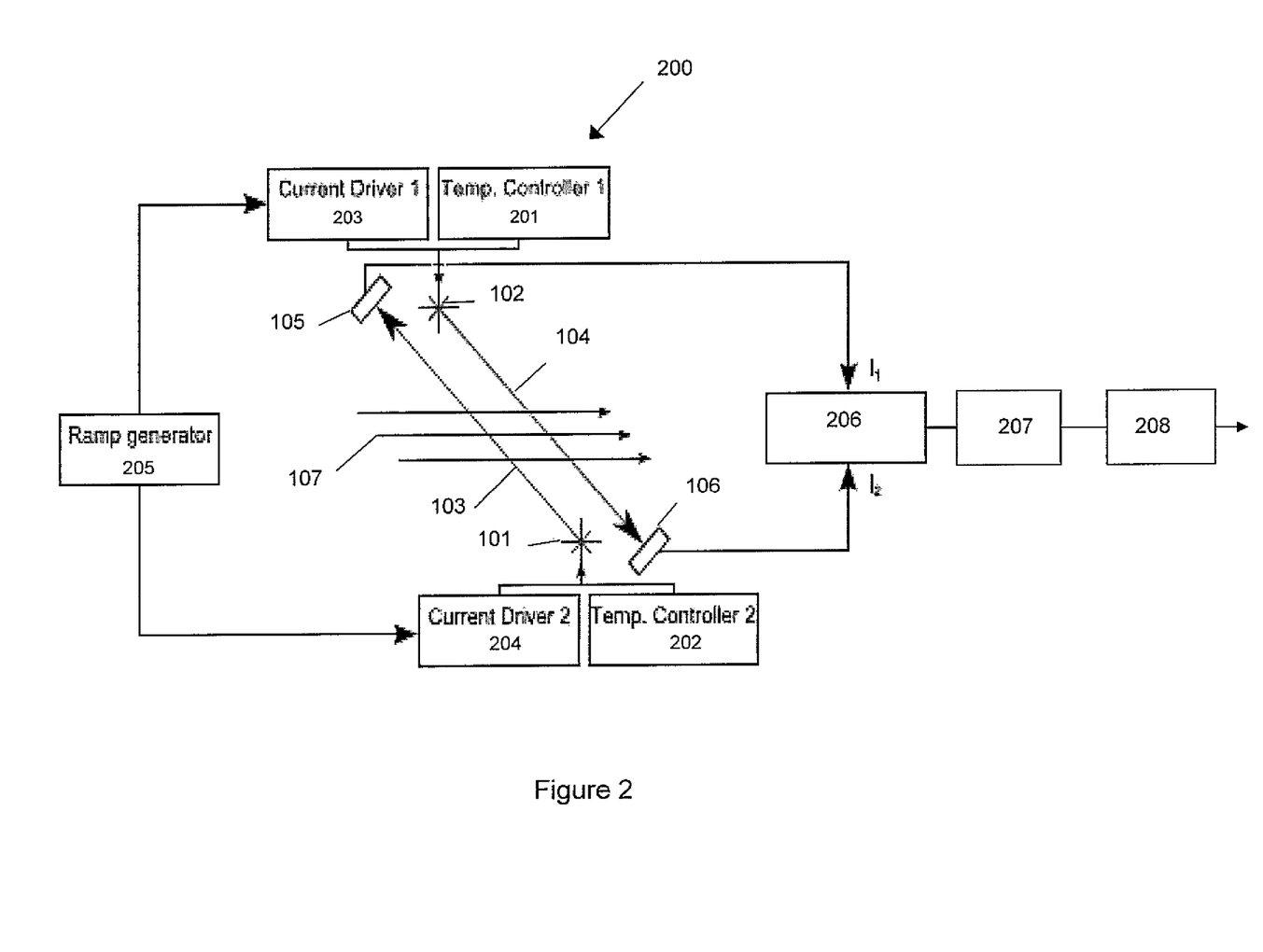
FIG. 2 shows a schematic representation of a system for determining a velocity in accordance with another embodiment of the present invention.

The absorption can be determined for each laser beam by detecting spectral intensity profiles as a function of spectral parameters, such as wavelength or frequency. FIG. 2 illustrates a system 200 for determining the relative velocity that can be used for this purpose and comprises the previously described system 100 together with additional components. In this particular embodiment, wavelengths of the two laser sources are controlled by temperature controllers 201, 202 and current drivers 203, 204. The temperature controllers 201 and 202 set the centre wavelength for each laser source 101 and 102, and a ramp generator 205 in combination with the current drivers 203 and 204 scans over a selected wavelength range at a frequency of 10 kHz. The centre wavelength of each laser beam 103 and 104 is adjusted separately for each laser source 101 and 102. After the two laser beams propagate through the fluidal medium, optical absorption is detected by the two diodes 105 and 106 for each laser beam. The detected signals are then processed by a difference amplifier 206, rectifier 207 and integrator 208. A band pass filter may be used to reduce noise and high-frequency RF interference.

The absorption features of the spectral profiles are Doppler shifted and an amount of that shift is dependent on the relative velocity and on an orientation of a respective light beam relative to a direction of movement (which is known). Consequently, the velocity can be calculated by analysing the Doppler-shifted spectral features. In this particular embodiment the light beams are directed in anti-parallel directions and consequently the absorption features of the spectral profiles experience a Doppler shift in opposite spectral directions.

The following will explain in more detail how the velocity can be calculated from the Doppler shift. The spectral intensity profile has a spectral position which can be used to determine an absorption line or centre wavelength. The spectral position is Doppler-shifted by an amount indicative of the velocity u. The Doppler shift of the spectral intensity profile or the absorption line can be determined by:

$$\Delta v_D = \frac{v_0 u \cdot \cos\psi}{c} \quad \text{eq. (1)}$$

with c representing the speed of light, $v_0$ representing the spectral position of an absorption line, $\Delta v_D$, representing the wavelength shift from $v_0$ and Ψ the angle between the direction of the relative movement and the laser beam.

The average velocity u of the relative movement is:

$$u = \frac{c \cdot \Delta v_D}{v_0 \cos\Psi} \quad \text{eq. (2)}$$

For relative movements that are in the range of subsonic to transonic velocities, a Doppler-shifted spectral intensity profile typically overlaps with the spectral intensity profile determined before the laser beam propagates through at least a portion of the fluidal medium. Consequently, it is difficult to determine the velocity using one laser beam. This problem can be overcome by using two or more light beams that may be directed through the fluidal medium at relative orientations selected such that spectral profiles of each light beam experience different Doppler shifts. For example, the light beams may be directed in directions that are anti-parallel to each other as illustrated in FIGS. 1 and 2.

Figure 3:
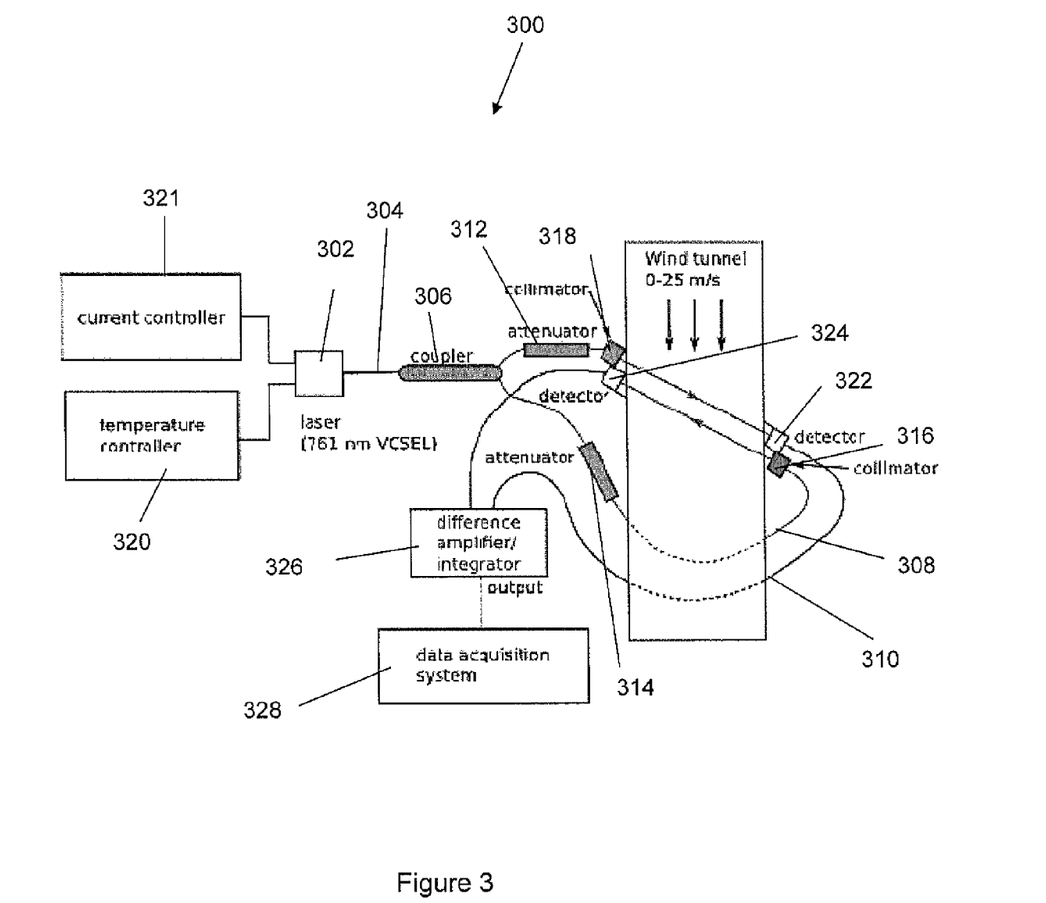
FIG. 3 shows a schematic representation of a system for determining a velocity in accordance with a further embodiment of the present invention.

FIG. 3 illustrates a further example of a system for determining the relative velocity. The system 300 comprises a variation of the previously described system 100 and further components. In this example the light source comprises a single laser 302 that is provided in the form of a vertical cavity surface emitting laser VCSEL). The emitted laser light is coupled into an optical fibre 304 and split by and optical coupler/splitter 306 into two light beams that are directed in optical fibres 308 and 310 via attenuators 312, 314 to collimators 316, 318. The light beams exit the collimators 316, 318 and penetrate through the fluidal medium. The laser 302 is controlled by temperature controller 320 and current controller 321. Similar to the embodiment described with reference to FIG. 2, the temperature controller 320 sets the centre wavelength for the VCSEL and the current controller 321 scans over a selected wavelength range at a frequency of 10 kHz (or another suitable frequency). After the two laser beams propagate through the fluidal medium, optical absorption is detected by the detectors 322, 324. The detected signals are then processed by a difference amplifier/integrator 326 and processed by data acquisition system 328.

Compared with the system 200 illustrated with reference to FIG. 2, the system 300 has the particular additional advantage that an influence of possible vibrations on the measurement result is reduced as the light beams are guided to and from the fluidal medium by optical fibres.

Figure 4:
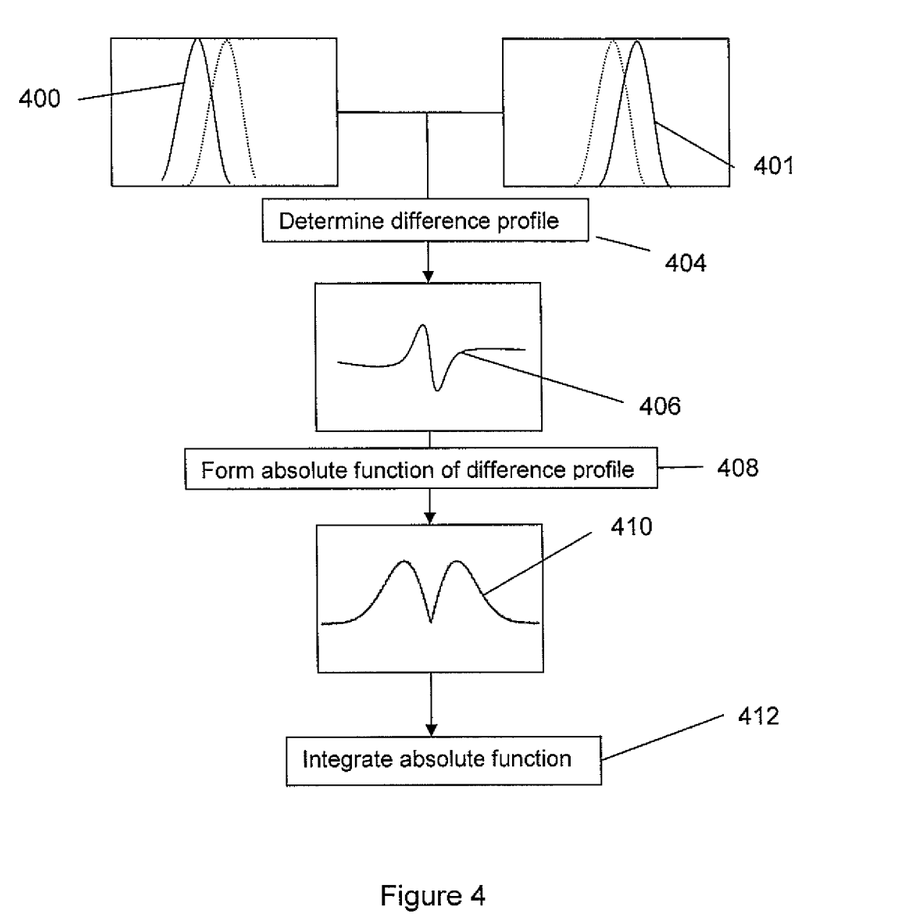
FIG. 4 illustrates a method for determining the velocity in accordance with the system of FIG. 2 or 3.

Referring to FIG. 4, processing steps are now illustrated. Two spectral intensity profiles 400 and 401 are detected by the photo diodes 105 and 106 as illustrated in FIG. 1. As shown in FIG. 4, each of the two spectral intensity profiles 400 and 401 has a different spectral position and are both spectral features are Doppler-shifted, which is indicative of the velocity. As illustrated in FIG. 1, the two laser beams 102 and 103 propagate in opposite directions. Consequently, the corresponding spectral intensity profiles 400 and 401 are Doppler-shifted in opposite spectral directions. FIG. 4 illustrates the unshifted spectral profiles in the form of dashed lines.

In step 404 the spectral intensity profiles 400 and 401 are processed to determine a difference profile 406. For example, the differential amplifier 206 shown in FIG. 2 may be used for this purpose.

The difference profile 406 is a function of the spectral parameters such as wavelength and can be determined by:

$$S_a = n(I_1 - I_2) \quad \text{(eq. 3)}$$

with $S_a$ being the difference profile, n being an amplification factor of the differential amplifier and $I_1$, $I_2$ being the two detected spectral intensity profiles for respective laser beams.

In a subsequent step 408 the difference profile is further processed to convert the difference profile to one polarity such as a negative or a positive polarity 410. The absolute function of the difference profile is then integrated (step 412).

The difference profile $S_a$ (step 408) may be determined by:

$$S_a = |n(I_1 - I_2)| \quad \text{(eq. 4)}$$

In this case the difference profile is converted to a positive polarity.

Figure 5:
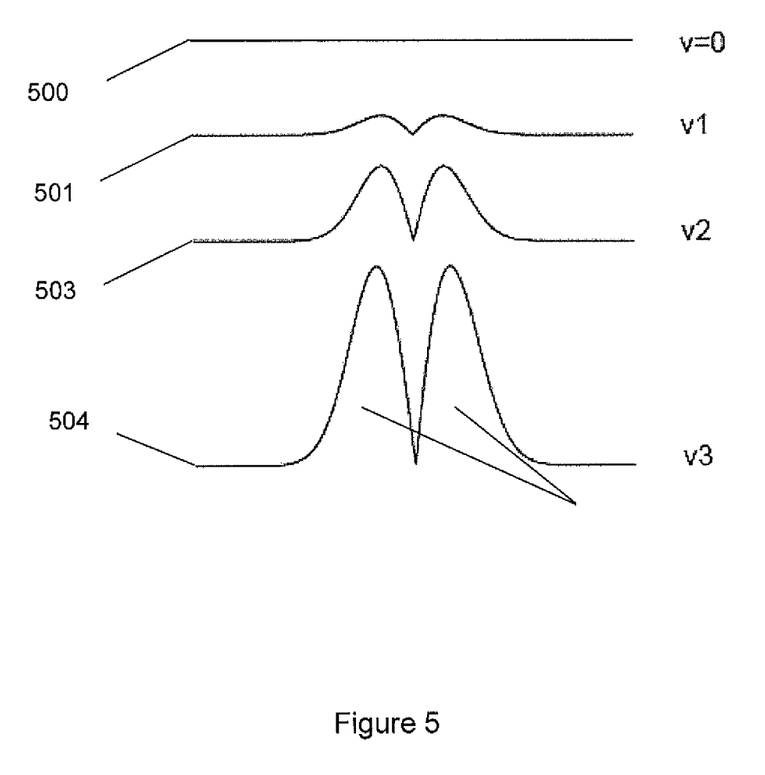
FIG. 5 shows different difference profiles that are determined in accordance with a method step in accordance with the method of FIG. 4.

Such difference profiles are illustrated in FIG. 5 for different velocities of the relative movement.

The difference profile 500 corresponds to a velocity of a relative movement equal to 0. Difference profiles 501, 502 and 503 correspond to different velocities v1, v2 and v3, respectively.

Two main peaks of each difference profiles 501, 502 can be identified. The distance between the two peaks (exemplarily shown for difference profile 503) is indicative of the velocity. In this embodiment the two laser beams are directed in opposite directions and the spectral intensity profiles are shifted in opposite spectral directions. Consequently, the distance between the two peaks is increasing with increasing velocity.

An area 506 defined by, or "under", difference profiles 504 for example is dependent on the velocity of the relative movement. The area defined by the determined difference profiles increases with increasing velocity for velocities that are below hypersonic velocity range.

The area defined by the difference profiles (such as area 506) can be determined by integrating the difference profiles (step 412).

$$A = \int |n(I_1 - I_2)| d\lambda \quad \text{(eq. 5)}$$

An absolute value A is determined which is indicative of the velocity of the relative movement.

It will also be appreciated by a person skilled in the art that the difference profiles shown in FIG. 5 are only schematic illustrations. Measured difference profiles may comprise noise and may also have to be calibrated. In one example, a difference profile 500 may be determined at zero velocity and subtracted from determined difference profiles for non-zero velocities.

Further characteristics, such as a temperature or a pressure, of the fluidal medium 107 may be also determined and may be used as calibration or correction factors. Changes in temperature or pressure may cause a change in spectral features and, if known, can be taken into account for determining the velocity with high precision from the Doppler shift of the spectral features. Information concerning the temperature and pressure can be derived from spectral analysis of for example relatively narrow spectral features (peaks), but may alternatively also be provided using suitable sensors that are readily available in or on an aircraft.

Figure 6:
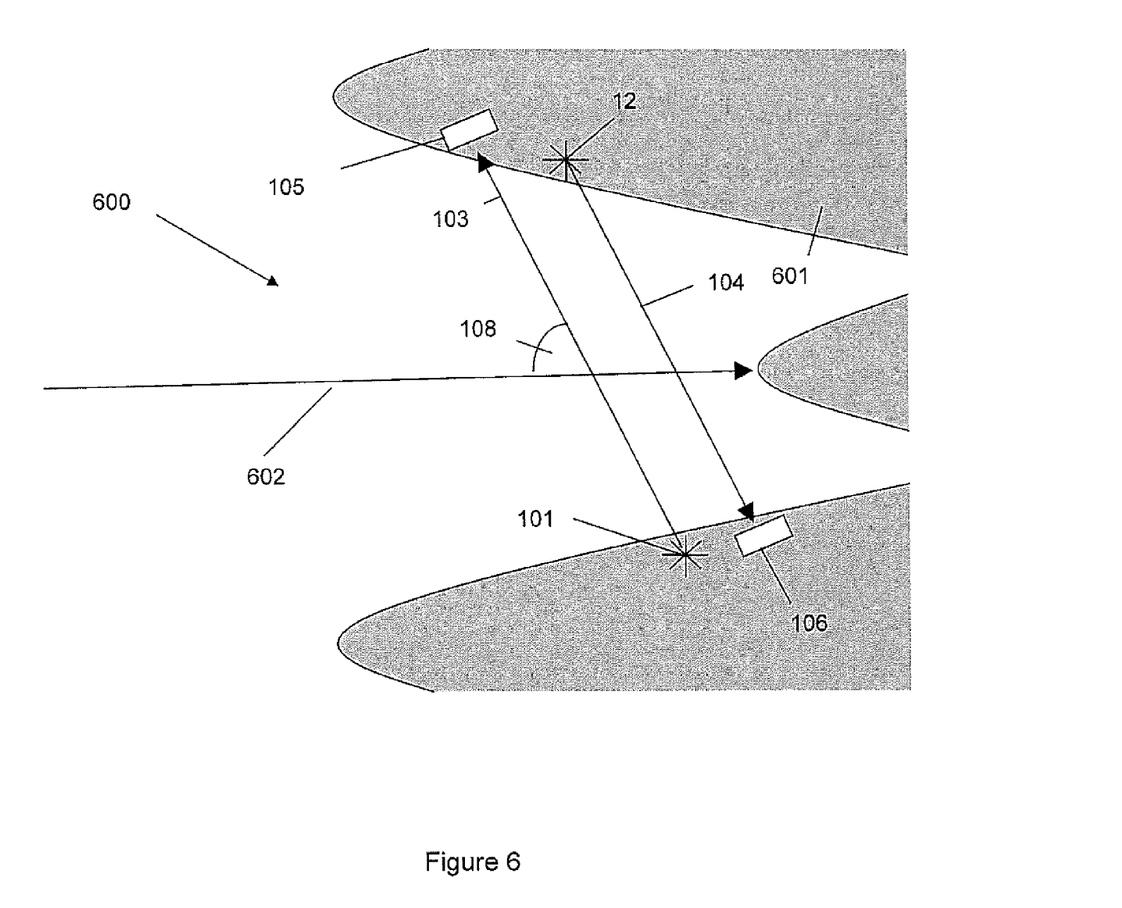
FIG. 6 shows a schematic representation of the system of FIG. 1 being arranged on an aircraft.

In FIG. 6, there is shown a specific embodiment illustrating the system 600 in accordance with FIG. 1 being arranged on an aircraft 601 in the proximity of the air intake of a jet engine. In this particular embodiment, the aircraft 601 is moving from the right side towards the left side and consequently the direction of the relative movement 602 between the aircraft 601 and the fluidal medium is in the opposite direction as illustrated by arrow 602.

In a particular embodiment of the present invention the system is mechanically implemented in two fully enclosed boxes (not shown). A glass window at the side of the direction of the path of light of the laser beam enables the laser beams to enter and exit the box.

Although the invention has been described with reference to particular examples, it will be appreciated by those skilled in the art that the invention may be embodied in many other forms.

The invention claimed is:

1. A method of determining a velocity of a relative movement between a system for determining the velocity and a fluidal medium, the method comprising the steps of:
   generating at least two light beams using one light source;
   directing the at least two light beams adjacent to each other through at least a portion of the fluidal medium using the system during a relative movement between the system and the fluidal medium such that a portion of light of each light beam is absorbed by the fluidal medium;
   detecting first and second spectral intensity profiles of the at least two light beams using a detector arrangement to detect the light absorption, wherein the detector arrangement is configured relative to the at least two adjacent light beams such that the beams are detected after propagation through at least a portion of the fluidal medium;
   determining a difference profile associated with spectral intensity differences between a first and a second spectral intensity profile; and
   performing an operation that results at least in an approximation of an integral of an absolute value function of the difference profile to determine the velocity;
   wherein the at least two light beams are directed such that the first and second spectral intensity profiles each have a different spectral position.

2. The method of claim 1 wherein the step of performing an operation that results at least in an approximation of an integral of an absolute value function of the difference profile is performed such that a value is generated that is a function of the velocity.

3. The method of claim 2 wherein the function of the velocity is a monotonic function for a given pressure and temperature of the fluidal medium.

4. The method of claim 1 wherein the step of performing an operation that results at least in an approximation of an integral comprises integrating an absolute value function of the difference profile to determine the velocity.

5. The method of claim 1 wherein the fluidal medium is a gaseous medium.

6. The method of claim 1 wherein the system is arranged on or in a moving object.

7. The method of claim 6 wherein the moving object is an aircraft.

8. The method of claim 1 wherein the at least two light beams are directed such that the spectral position of each spectral intensity profile is indicative of the velocity.

9. The method of claim 1 wherein the at least two light beams are directed through air and a portion of light of the at least two light beams is absorbed by oxygen molecules of the air.

10. The method of claim 1 wherein two light beams are directed such that the spectral profile associated with one of the light beams experiences a spectral shift in opposite spectral direction than the spectral profile of associated with the other one of the light beams as a function of the velocity.

11. The method of claim 1 wherein the step of performing an operation that results at least in an approximation of an integral comprises determining a value that is indicative of the velocity.

\* \* \* \* \*